(12) United States Patent
Iwane

(10) Patent No.: US 11,726,307 B2
(45) Date of Patent: Aug. 15, 2023

(54) CAMERA MODULE, OPTICAL APPARATUS, AND METHOD FOR MANUFACTURING CAMERA MODULE

(71) Applicant: Nikon Corporation, Tokyo (JP)

(72) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 283 days.

(21) Appl. No.: 17/050,073

(22) PCT Filed: Apr. 19, 2019

(86) PCT No.: PCT/JP2019/016734
§ 371 (c)(1),
(2) Date: Jan. 13, 2021

(87) PCT Pub. No.: WO2019/208407
PCT Pub. Date: Oct. 31, 2019

(65) Prior Publication Data
US 2021/0132348 A1   May 6, 2021

(30) Foreign Application Priority Data
Apr. 25, 2018   (JP) ................... 2018-084139

(51) Int. Cl.
*G02B 17/08*   (2006.01)
*H04N 23/55*   (2023.01)

(52) U.S. Cl.
CPC ............ *G02B 17/08* (2013.01); *H04N 23/55* (2023.01)

(58) Field of Classification Search
USPC .......................................................... 396/661
See application file for complete search history.

(56) References Cited

U.S. PATENT DOCUMENTS 6,036,324 A * 3/2000 Bernacki ............ G02B 17/0852
359/425
2004/0017606 A1 * 1/2004 Wang ................. G02B 27/0025
359/364
(Continued)

FOREIGN PATENT DOCUMENTS

CN   101427563 A   5/2009
JP   2004-179736 A   6/2004
(Continued)

OTHER PUBLICATIONS

Office Action dated Nov. 22, 2021, in Chinese Patent Application No. 201980027988.1.
(Continued)

*Primary Examiner* — Clayton E. LaBalle
*Assistant Examiner* — Warren K Fenwick
(74) *Attorney, Agent, or Firm* — Potomac Law Group, PLLC

(57) ABSTRACT

A camera module having a high resolution, high optical performance, and a reduced size, an optical apparatus including the camera module, and a method for manufacturing a camera module 1 are provided. The camera module 1 mounted on an optical apparatus such as a camera 60 includes an unit optical system UL including a primary reflection mirror 12 as a first reflection member and a secondary reflection mirror 13 as a second reflection member sequentially from an object side along an optical axis and configured to form an image of an object, an image sensor 14 configured to capture the image formed by the unit optical system UL, and a plurality of unit blocks 10 each including the unit optical system UL and the image sensor 14.

19 Claims, 13 Drawing Sheets

(56) References Cited

U.S. PATENT DOCUMENTS

| | | | |
|---|---|---|---|
| 2009/0067830 A1* | 3/2009 | Tamaki | G02B 27/0018 396/308 |
| 2010/0053770 A1* | 3/2010 | Sato | G02B 9/10 359/717 |
| 2013/0265475 A1 | 10/2013 | Tochigi et al. | |
| 2015/0212335 A1* | 7/2015 | Shimatani | G02B 30/56 359/479 |
| 2022/0099949 A1* | 3/2022 | Iwane | G02B 13/18 |
| 2022/0137276 A1* | 5/2022 | Iwane | G03B 15/02 359/485.01 |

FOREIGN PATENT DOCUMENTS

| | | |
|---|---|---|
| JP | 2005-051318 A | 2/2005 |
| JP | 2010-028289 A | 2/2010 |
| JP | 2010-054810 A | 3/2010 |
| JP | 2013-218022 A | 10/2013 |
| WO | WO 2007/123064 A1 | 11/2007 |

OTHER PUBLICATIONS

Office Action dated Oct. 28, 2021, in Japanese Patent Application No. 2020-516295.
International Search Report from International Patent Application No. PCT/JP2019/016734, dated Jul. 23, 2019.
Written Opinion of the International Searching Authority from International Patent Application No. PCT/JP2019/016734, dated Jul. 23, 2019.
**English Translation to be provided when available.
English Translation of International Preliminary Report on Patentability (including Written Opinion of the ISA) from International Patent Application No. PCT/JP2019/016734, dated Oct. 27, 2020.
Office Action dated Jun. 6, 2022, in Chinese Patent Application No. 201980027988.1.

* cited by examiner

[Fig.1]
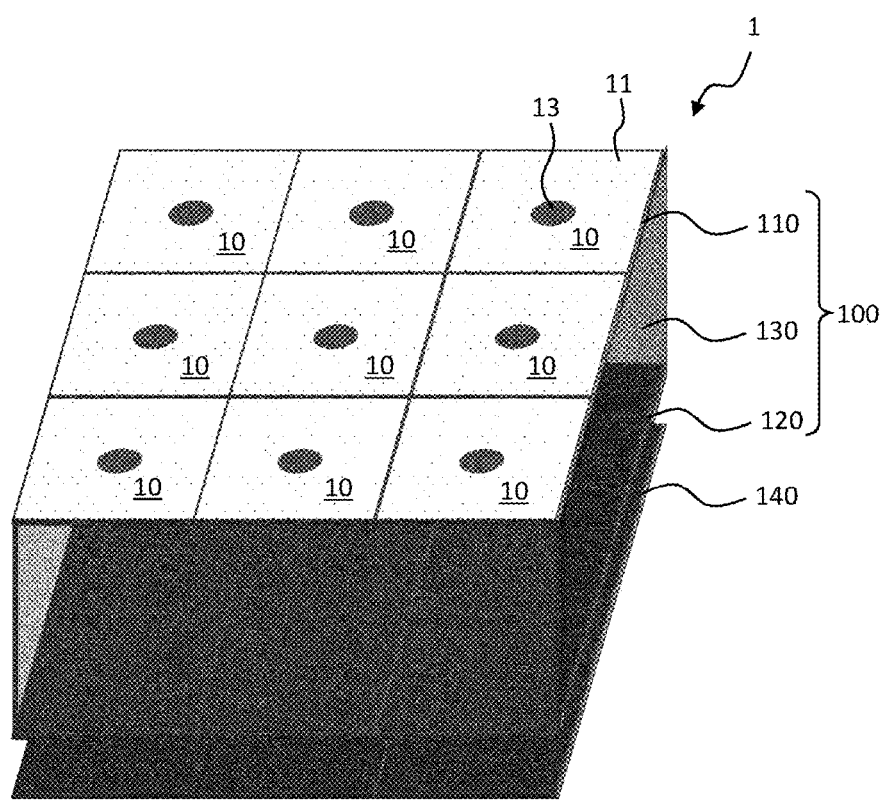

[Fig.2]
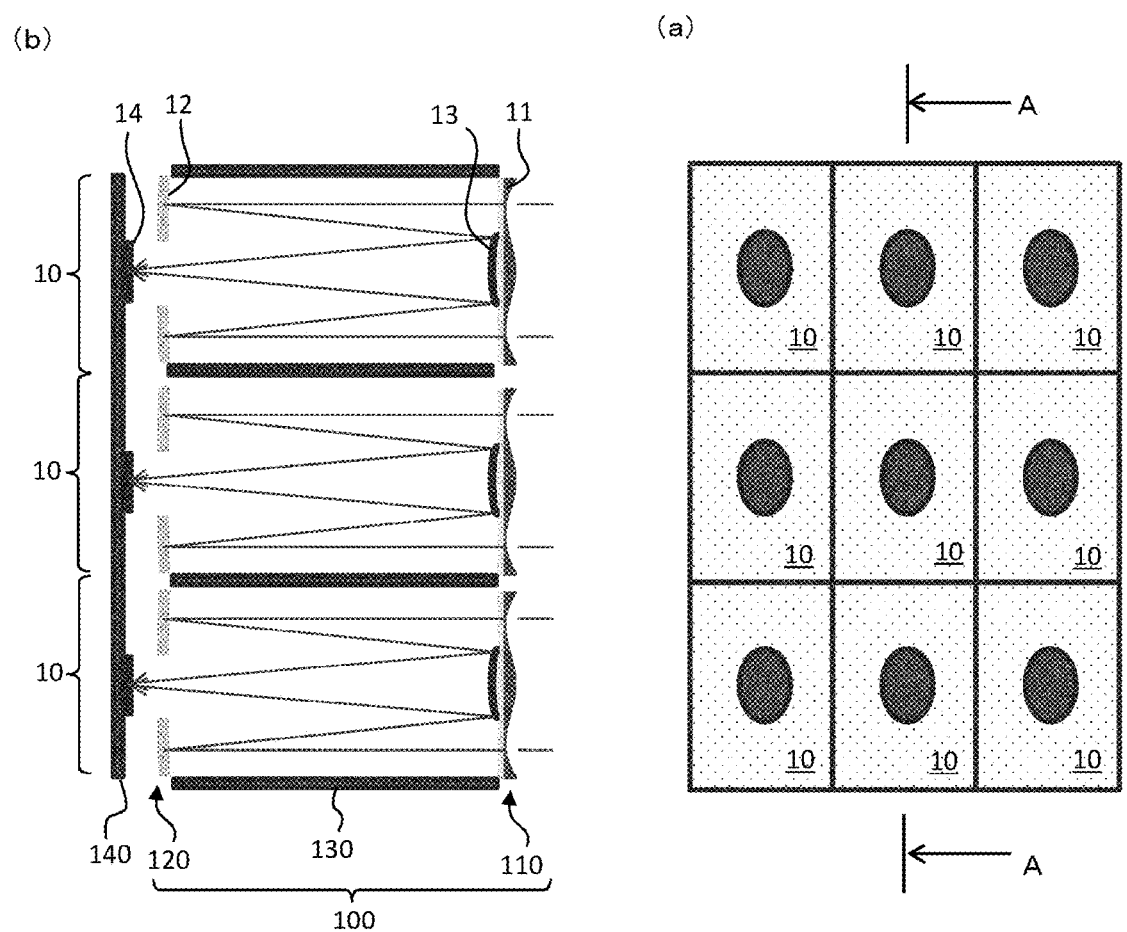

[Fig.3]
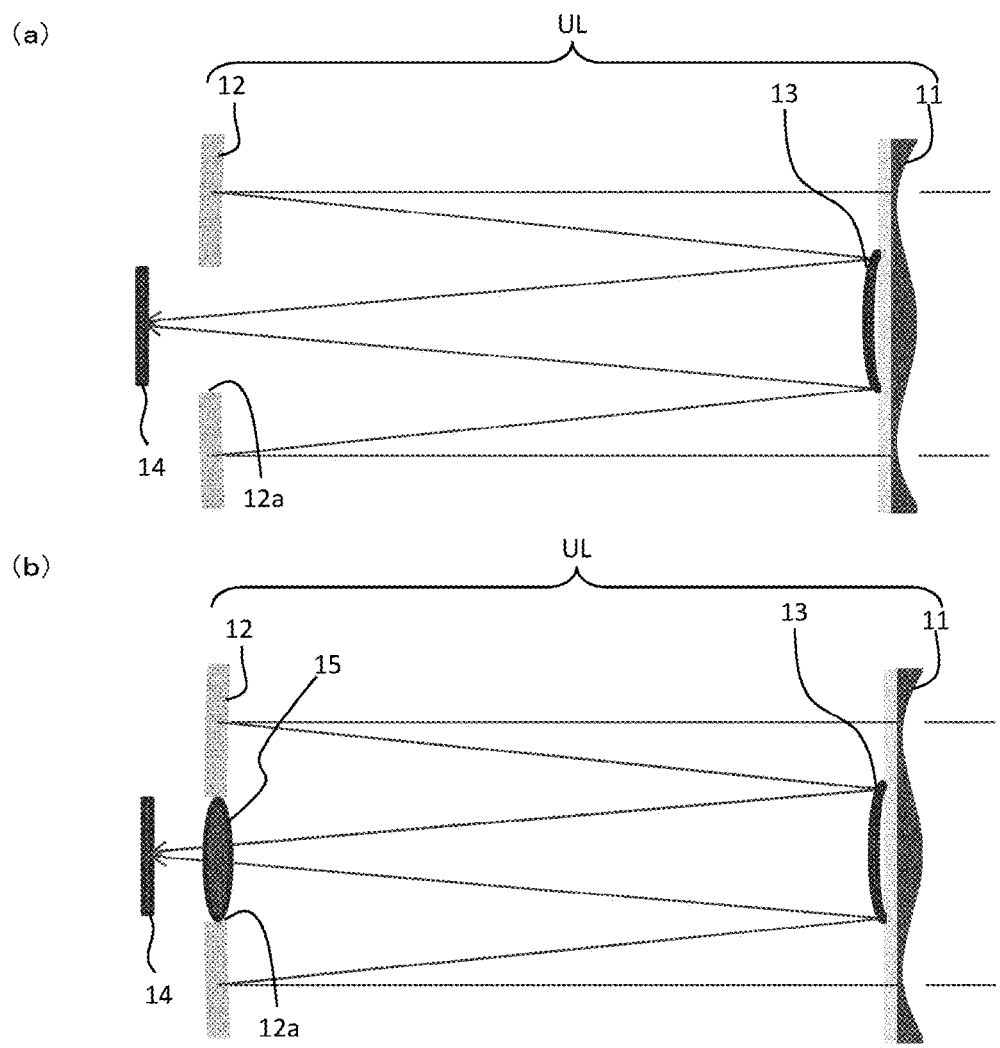

[Fig.4]
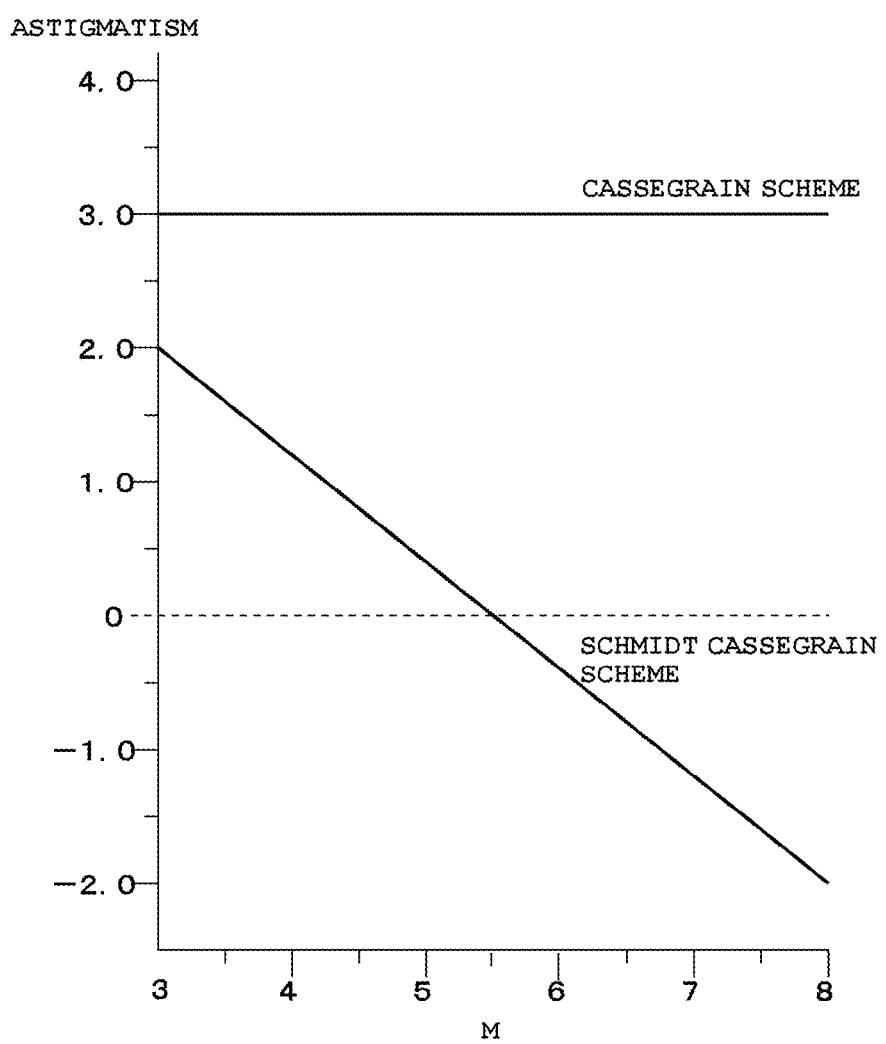

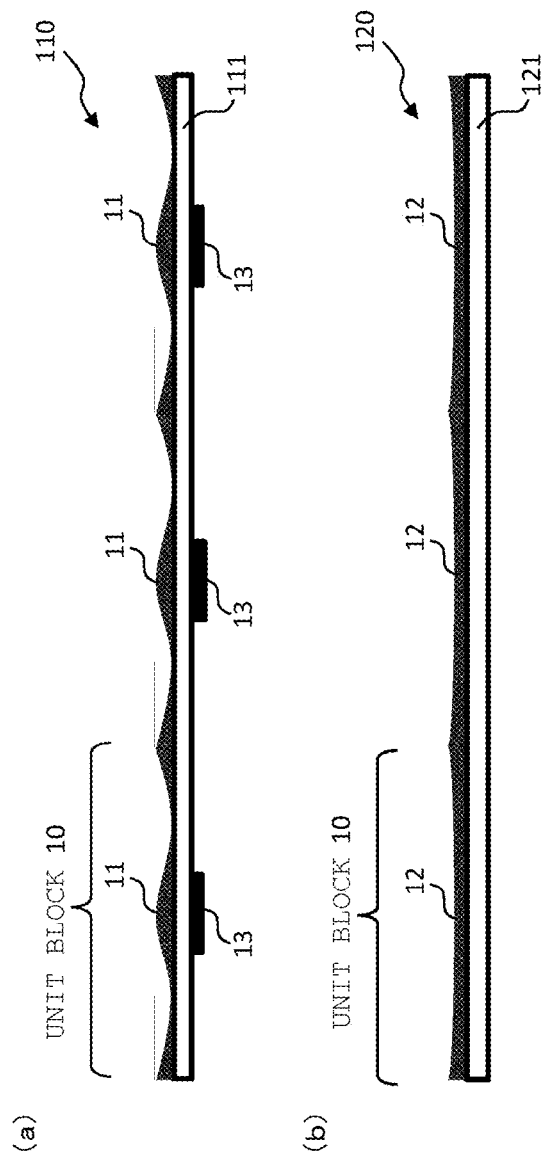

[Fig.6]
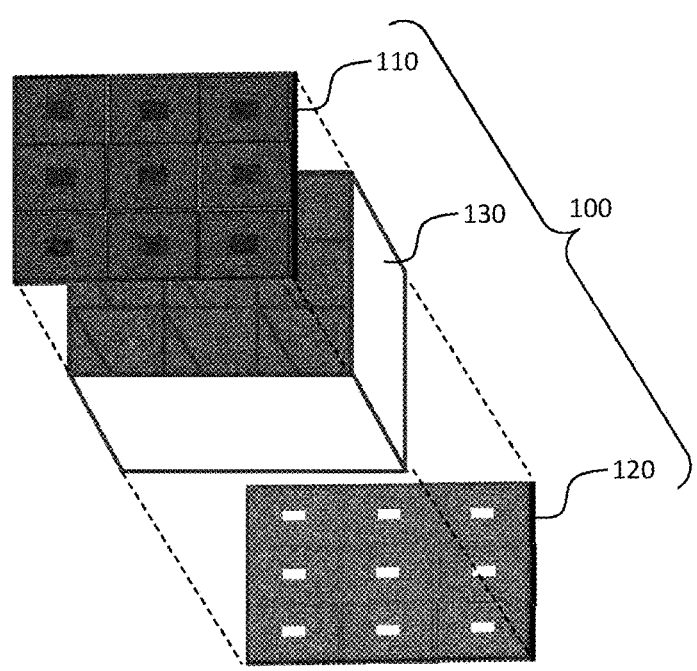

[Fig.7]
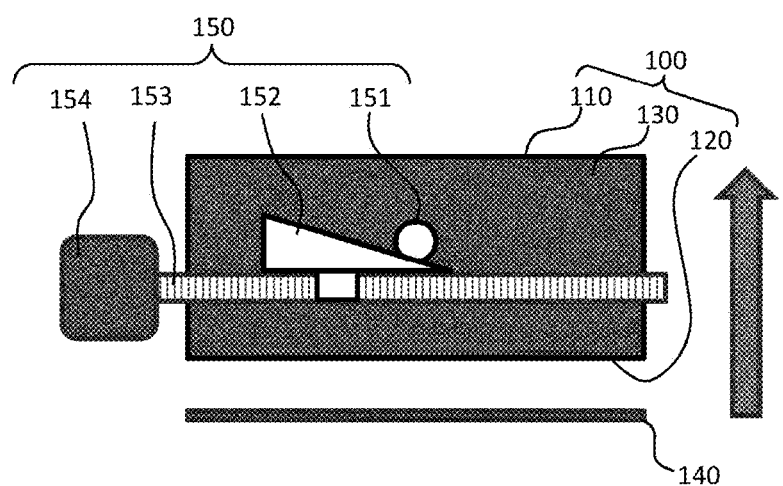

[Fig.8]
(a)
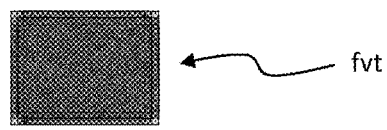
(b)
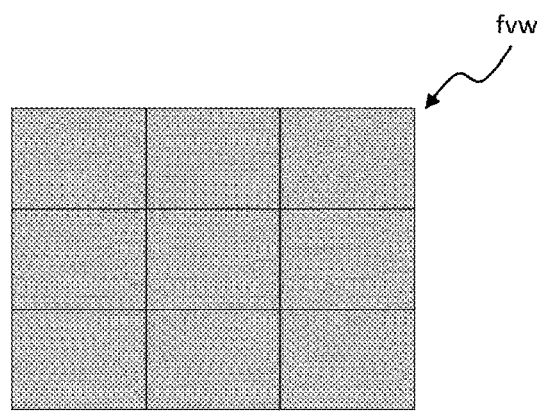

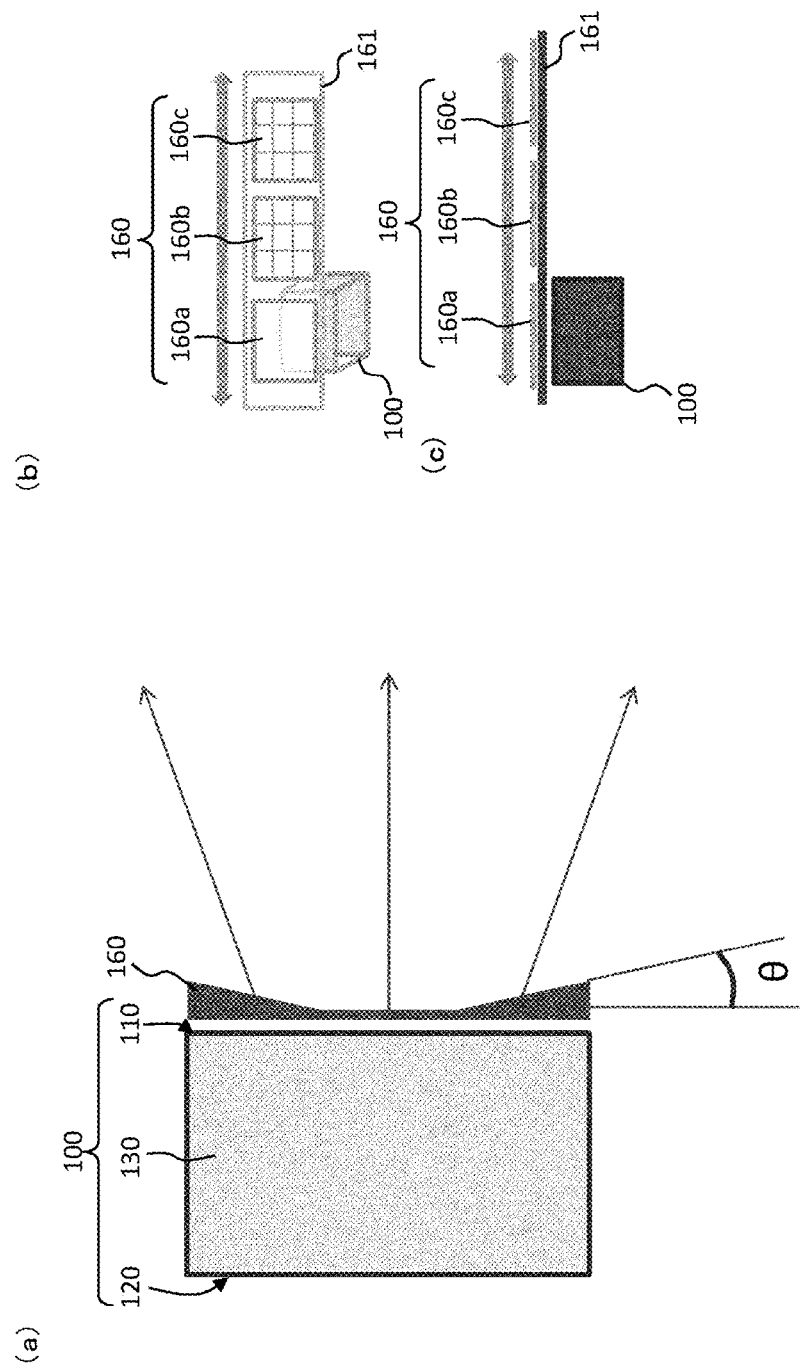
[Fig. 9]

[Fig.10]
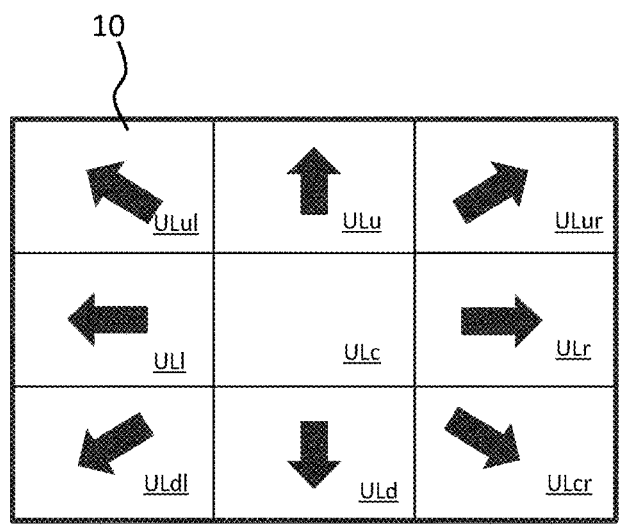

[Fig.11]
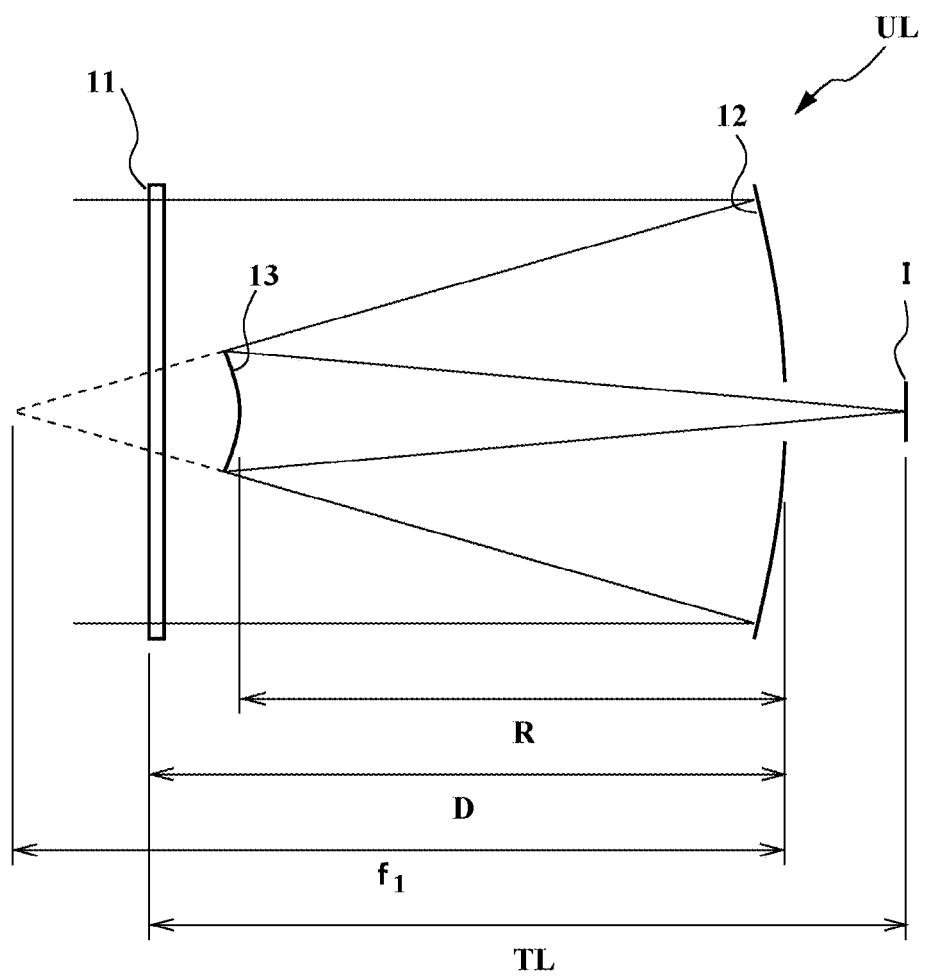

[Fig.12]
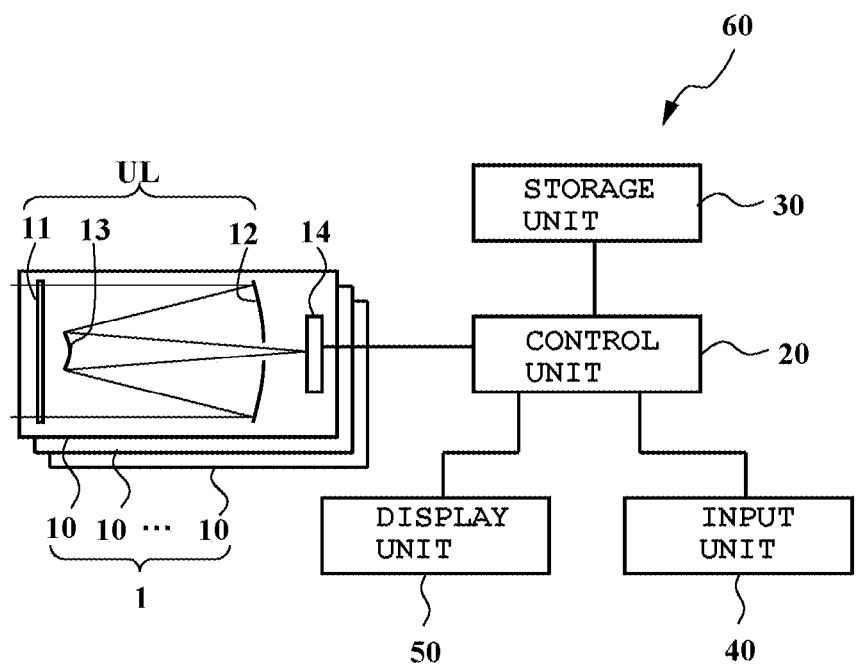

[Fig.13]
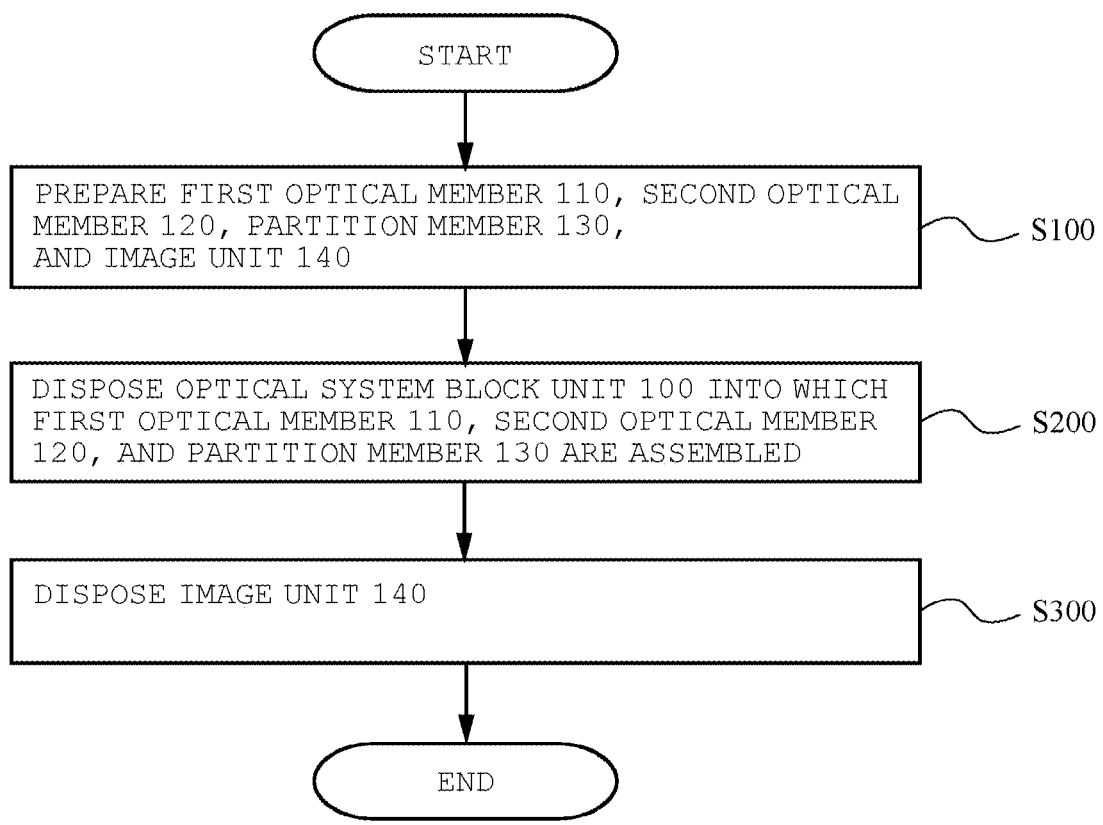

CAMERA MODULE, OPTICAL APPARATUS, AND METHOD FOR MANUFACTURING CAMERA MODULE

TECHNICAL FIELD

The present invention relates to a camera module, an optical apparatus, and a method for manufacturing a camera module.

BACKGROUND ART

Conventionally, a camera module including a plurality of camera modules to achieve high resolution has been disclosed (refer to Patent Literature 1, for example). However, further improvement of optical performance is required for Patent Literature 1, which has been a problem.

CITATION LIST

Patent Literature

Patent Literature 1: Japanese Patent Laid-Open No. 2005-051318

SUMMARY OF INVENTION

A camera module according to a first aspect of the present invention includes a unit optical system including a first reflection member and a second reflection member sequentially from an object side along an optical axis and configured to form an image of an object, an image sensor configured to capture the image formed by the unit optical system, and a plurality of unit blocks each including the unit optical system and the image sensor.

A method for manufacturing the camera module according to the first aspect of the present invention is a method for manufacturing a camera module including a unit optical system including a first reflection member and a second reflection member sequentially from an object side along an optical axis and configured to form an image of an object, an image sensor configured to capture the image formed by the unit optical system, and a unit block including the unit optical system and the image sensor, the method including a step of disposing a plurality of the unit blocks.

BRIEF DESCRIPTION OF DRAWINGS

FIG. 1 is a perspective view illustrating the appearance of a camera module.

FIG. 2 is an explanatory diagram illustrating the camera module: (a) is a front view; and (b) is a cross-sectional view taken along line A-A in (a).

FIG. 3 is a cross-sectional view of a unit optical system included in the camera module: (a) illustrates a basic configuration of a Schmidt Cassegrain scheme; and (b) illustrates a configuration in which a lens is added to (a).

FIG. 4 is a graph illustrating the relation between a secondary magnification ratio and astigmatism in optical systems of the Schmidt Cassegrain scheme and a Cassegrain scheme.

FIG. 5 is an explanatory diagram illustrating the configurations of a first optical member and a second optical member.

FIG. 6 is an explanatory diagram illustrating the configuration of an optical system block unit.

FIG. 7 is an explanatory diagram for description of a focusing mechanism.

FIG. 8 is an explanatory diagram for description of the visual field of the camera module: (a) illustrates a telephoto-end state; and (b) illustrates a wide-angle-end state.

FIG. 9 is an explanatory diagram for description of a magnification-varying mechanism: (a) illustrates a side view; and (b) and (c) illustrate a top view and a side view for description of a magnification-varying method.

FIG. 10 is an explanatory diagram illustrating the moving direction of the visual field of each unit optical system when magnification is varied from the telephoto-end state to the wide-angle-end state.

FIG. 11 is an explanatory diagram illustrating the configuration of the unit optical system.

FIG. 12 is a schematic diagram of a camera including the camera module.

FIG. 13 is a flowchart illustrating a method for manufacturing the camera module.

DESCRIPTION OF EMBODIMENT

A preferable embodiment will be described below with reference to the accompanying drawings.

(Configuration of Camera Module 1)

As illustrated in FIGS. 1 and 2, a camera module 1 according to the present embodiment has a configuration in which unit blocks 10 each including a combination of a unit optical system UL and an image sensor 14 are two-dimensionally arrayed. At each unit block 10, light from an object side is imaged by the unit optical system UL, and a subject image is captured by the image sensor 14. The following description is made on a case in which the camera module 1 includes a total of nine unit blocks 10 on three rows and three columns (hereinafter referred to as "3×3") as illustrated in FIG. 1, but the same effects can be obtained with a configuration including two or more unit blocks 10. The number of unit blocks 10 included in each row and the number of unit blocks 10 included in each column do not necessarily need to be equal to each other. However, at synthesis of images acquired from the image sensors included in the unit blocks 10 as described later, it is possible to generate an image having the same resolution in the longitudinal and lateral directions when the number of unit blocks 10 included in each row and the number of unit blocks 10 included in each column are equal to each other.

As illustrated in FIG. 3(a), the optical system of each unit block 10 is an optical system (hereinafter referred to as a "unit optical system") UL of what is called a Schmidt Cassegrain scheme (or a compact Schmidt Cassegrain scheme) and includes, sequentially from the object (subject) side along the optical axis, a correction plate 11 as a transmissive member that has a high-order aspherical surface on the object side and transmits light from an object, a primary reflection mirror 12 as a first reflection member that has a reflection surface that is concave on the object side and reflects the light having transmitted through the correction plate 11, and a secondary reflection mirror 13 as a second reflection member that is disposed on the object side to face the primary reflection mirror 12, has a reflection surface that is convex on an image side (the primary reflection mirror 12 side), and reflects light reflected by the primary reflection mirror 12. At a central part of the primary reflection mirror 12, an aperture part 12a is formed to include the optical axis of the unit optical system UL of the unit block 10, and light reflected by the secondary reflection mirror 13 passes through the aperture part 12a. The image sensor 14 is disposed on the image side of the primary reflection mirror 12 to face the aperture part 12a. The primary reflection mirror 12 and the secondary reflection mirror 13 are configured to condense light from the object, and the unit block 10 is configured so that the image sensor 14 is positioned at a focal point of the primary reflection mirror 12 and the secondary reflection mirror 13 (focal point of the unit optical system UL). In this manner, sequentially from the object side, the optical axis of the unit optical system UL transmits through the correction plate 11, is reflected and bent at the primary reflection mirror 12, and is reflected bent at the secondary reflection mirror 13 again. The optical axes of the unit optical systems UL included in the camera module 1 are disposed substantially in parallel to one another. The configuration of each unit optical system UL is described above as "sequentially from the object side along the optical axis", but may be "sequentially from the object side along the traveling path of a ray in the optical system" or "along the optical path". The high-order aspherical surface of the correction plate 11 may be formed not only at a surface on the object side but also at a surface on the image side.

(Unit Optical System UL)

The unit optical system UL included in each unit block 10 is configured as a reflection optical system as described above, and aberration generated at the primary reflection mirror 12 and the secondary reflection mirror 13 is corrected by the high-order aspherical surface (for example, fourth curved surface) as the surface of the correction plate 11 on the object side, and thus it is possible to obtain an image having no coma aberration, astigmatism, nor distortion as a whole. As illustrated in FIG. 3(*b*), the unit optical system UL may be provided with a refractive optical system (for example, lens) 15 configured to refract light passing through the aperture part 12a of the primary reflection mirror 12. The unit optical system UL may be an optical system of a Cassegrain scheme, which does not include the correction plate 11.

In the camera module 1 according to the present embodiment, since the unit optical system UL of each unit block 10 is configured as a folding optical system (reflection optical system of the Cassegrain scheme, the Schmidt Cassegrain scheme, or the compact Schmidt Cassegrain scheme) as described above, the length of the optical system (physical distance from a surface closest to the object side (in the case of FIG. 3, the surface of the correction plate 11 on the object side) to an image plane (image surface of the image sensor 14)) can be reduced to ½ to ⅓ of that in a case in which the unit optical system UL is configured as a refractive optical system. In addition, since the camera module 1 according to the present embodiment includes the plurality of unit blocks 10 and images acquired by the image sensors 14 of the unit blocks 10 can be synthesized to acquire an image of a high resolution equal to or higher than the resolution of each image sensor 14, it is possible to reduce the size of the image sensor 14 (even when the size of each image sensor 14 is reduced and the resolution thereof is reduced, it is possible to acquire an image of a higher resolution by synthesizing images). The focal length of the optical system of the unit block 10 can be shortened through this size reduction of the image sensor 14. Thus, due to effects of employing the folding optical system and synthesizing images of the plurality of unit blocks 10, the total length of the camera module 1 according to the present embodiment can be shortened to ¼ less of the total length of a camera module made of one unit block 10 using a refractive optical system having the same resolution.

The unit optical system UL of each unit block 10 included in the camera module 1 according to the present embodiment desirably satisfies Condition Expression (1) below:

$$3.0 < M < 8.0 \quad (1)$$

where

M represents $f/f_1$, f represents the overall focal length of the unit optical system UL of the unit block 10, and $f_1$ represents the focal length of the primary reflection mirror 12.

Condition Expression (1) indicates an appropriate range of a secondary magnification ratio M of the unit optical system UL when the unit optical system UL of the unit block 10 is configured as a reflection optical system of the Schmidt Cassegrain (or compact Schmidt Cassegrain) scheme.

FIG. 4 illustrates astigmatism against the secondary magnification ratio M in reflection optical systems of the Cassegrain scheme and the Schmidt Cassegrain scheme. As understood from FIG. 4, astigmatism can be made zero by setting the secondary magnification ratio M to be 5.6 when the unit optical system UL is configured as a reflection optical system of the Schmidt Cassegrain scheme (or the compact Schmidt Cassegrain scheme). Thus, when the unit optical system UL satisfies Condition Expression (1), it is possible to prevent generation of astigmatism and acquire a favorable image. The lower limit value of Condition Expression (1) is more desirably set to be 3.5, 4.0, 4.5, or 5.0 to make reliable the effect of Condition Expression (1). In addition, to make reliable the effect of Condition Expression (1), the upper limit value of Condition Expression (1) is more desirably set to be 7.5, 7.0, 6.5, or 6.0.

In addition, the unit optical system UL of each unit block 10 included in the camera module 1 according to the present embodiment desirably satisfies Condition Expression (2) below:

$$f < 500 \text{ mm} \quad (2)$$

where f represents the overall focal length of the unit optical system UL of the unit block 10.

Condition Expression (2) indicates an appropriate range of the overall focal length of the unit optical system UL when the unit optical system UL of the unit block 10 is configured as a reflection optical system of the Schmidt Cassegrain (or compact Schmidt Cassegrain) scheme. To make reliable the effect of Condition Expression (2), the lower limit value of Condition Expression (2) is more desirably set to be 0.1 mm, 1 mm, 5 mm, 10 mm, or 20 mm. In addition, to make reliable the effect of Condition Expression (2), the upper limit value of Condition Expression (2) is more desirably set to be 380 mm, 280 mm, 230 mm, 190 mm, 140 mm, 90 mm, 70 mm, 55 mm, or 45 mm.

In the camera module 1 according to the present embodiment, when the unit optical system UL of each unit block 10 is of the compact Schmidt Cassegrain scheme, a thickness ΔL of the correction plate 11 is expressed by Expression (3) below.

$$\Delta L = [(h/r)^4 - 1.5(h/r)^2]/\{256(n-1)P'^3\} + k \quad (3)$$

where

P' represents $P_1/G^{1/3}$, $P_1$ represents the f-number of the primary reflection mirror 12, G represents a ratio of a calculation depth of the correction plate 11, h represents a height in a direction orthogonal to the optical axis, r represents a correction radius (radius of curvature) of the correction plate 11, n represents the refractive index of a medium included in the correction plate 11, and k represents the central thickness of the correction plate 11.

In the camera module 1 according to the present embodiment, a transmissive member configured to transmit light from the object may be provided at a position on the optical path as appropriate. When the transmissive member is provided, it is possible to achieve aberration correction by, for example, forming an aspherical surface at the transmissive member. The aspherical surface of the transmissive member preferably has at least one inflection point from the optical axis toward the periphery.

In addition, the unit optical system UL of each unit block 10 included in the camera module 1 according to the present embodiment desirably satisfies Condition Expression (4) below:

$$-0.1 < f/fa < 0.1 \quad (4)$$

where fa represents the focal length of the transmissive member, and f represents the overall focal length of the unit optical system UL of the unit block 10.

The unit optical systems UL of the plurality of unit blocks 10 may have an identical optical property (for example, the focal length) as described above, or the unit optical system UL of at least one of the unit blocks 10 may have an optical property different from that of the others. In addition, not all image sensors 14 need to be disposed on the focal point of the unit optical system UL, but disposition of at least one of the image sensors 14 may be shifted from the focal point in the optical axis direction.

(Assembly Structure of Camera Module 1)

The following describes an assembly structure of the camera module 1 according to the present embodiment. As illustrated in FIGS. 1 and 2, the camera module 1 according to the present embodiment includes a first optical member 110 at which the correction plate 11 (transmissive member) and the secondary reflection mirror 13 (second reflection member) are formed, a second optical member 120 at which the primary reflection mirror 12 (first reflection member) is formed, a partition member 130 disposed between the first optical member 110 and the second optical member 120 and provided at the boundary between the unit blocks 10 to prevent a ray from being incident on the adjacent unit blocks 10, and an image unit 140 at which the image sensor 14 is disposed.

In the first optical member 110, as illustrated in FIG. 5(*a*), a plurality of correction plates 11 are formed (in the example illustrated in FIG. 1, nine correction plates 11 in a 3×3 matrix are formed) by imprinting polymer as a medium that transmits light on the upper surface (surface on the object side in the unit optical system UL) of a parallel plane glass plate 111 formed of a medium that transmits light. The first optical member 110 may be produced, by cutting, from a substrate material on which the correction plates 11 are imprinted. In addition, a plurality of secondary reflection mirrors 13 are formed (in the example illustrated in FIG. 1, nine secondary reflection mirrors 13 in a 3×3 matrix are formed) by mask-coating a reflection member that reflects light on the lower surface (surface on the image side in the unit optical system UL) of the parallel plane glass plate 111. In this manner, since the plurality of correction plates 11 and the plurality of secondary reflection mirrors 13 are formed on both surfaces of one parallel plane glass plate 111, it is possible to manufacture, through a single process, for example, the correction plate 11 and the secondary reflection mirror 13 of each of the nine unit blocks 10 in a 3×3 matrix illustrated in FIG. 1.

In the second optical member 120, as illustrated in FIG. 5(*b*), a plurality of primary reflection mirrors 12 are formed (in the example illustrated in FIG. 1, nine primary reflection mirrors 12 in a 3×3 matrix are formed) by mask-coating a reflection member that reflects light on the upper surface of a parallel plane glass plate 121 formed of a medium that transmits light. Since the parallel plane glass plate 121 is formed of a medium that transmits light, the aperture part 12*a* can be formed in each unit block 10 by forming a part at which the primary reflection mirror 12 is not mask-coated. In this manner, since the primary reflection mirrors 12 are formed on one surface (surface on the object side in the unit optical system UL) of one parallel plane glass plate 121, it is possible to manufacture, through a single process, for example, the primary reflection mirror 12 of each of the 3×3 unit blocks 10 illustrated in FIG. 1.

When a refractive optical system 15 such as a lens is provided in the unit optical system UL as illustrated in FIG. 3(*b*), a lens surface that can refract a ray may be formed at the parallel plane glass plate 121.

As illustrated in FIG. 6, the partition member 130 is configured as an optical partition lattice that partitions the unit optical systems UL of the unit blocks 10. The first optical member 110 is disposed on the object side of the partition member 130, and the second optical member 120 is disposed on the image side of the partition member 130. When the first optical member 110 is fixed on the object side of the partition member 130 and the second optical member 120 is fixed on the image side of the partition member 130, the partition member 130 can prevent a ray from the unit optical system UL of each unit block 10 from being incident on an adjacent unit block 10, and also perform positioning of the first optical member 110 and the second optical member 120. Hereinafter, the first optical member 110, the second optical member 120, and the partition member 130 integrated with one another are referred to as an optical system block unit 100. Each partition of the partition member 130 is made of a light-shielding material such as metal or polymer and has a thickness of 0.5 to 1.0 mm approximately. Reflection prevention coating (for example, coating in black) is desirably provided inside the partition to optically shield each unit block 10 from outside and prevent reflection. The inside of the partition may be a hollow space (filled with air) or may be filled with a medium that transmits light.

As illustrated in FIG. 1, in the image unit 140, the plurality of image sensors 14 are disposed at positions corresponding to the respective unit optical systems UL. As described later, the position of the optical system block unit 100 relative to the image unit 140 in a direction along the optical axis may be fixed or variable.

(Focusing)

A closest distance of the camera module 1 according to the present embodiment may be determined with reference to a distance at which magnification of 50 to 100 approximately is obtained. In other words, the closest distance of the camera module 1 according to the present embodiment is different depending on the focal length. Table 1 below indicates the relation between the magnification and the extending amount of each unit optical system UL from infinity to the closest distance when the camera module 1 according to the present embodiment is equivalent to a telephoto optical system having a focal length of 300 mm, 500 mm, or 1000 mm when converted for a 35-mm camera. Since the unit optical system UL is integrated as the optical system block unit 100 as described above, the first optical member 110, the partition member 130, and the second optical member 120 are integrally separated from the image sensor 14 and move toward the object. Thus, the plurality (in the present embodiment, nine) of unit optical systems UL can be integrally moved since the plurality (in the present embodiment, nine) of correction plates 11 and the plurality (in the present embodiment, nine) of secondary reflection mirrors 13 are integrally formed, the plurality (in the present embodiment, nine) of primary reflection mirrors 12 are integrally formed, and the partition members that partition the unit blocks 10 are integrally formed.

TABLE 1

The relation between the magnification and the extending amount of the optical system from infinity to the closest distance
Focal length converted for 35-mm camera

| Magnification | 300 | 500 | 1000 |
|---|---|---|---|
| 100 | 0.20 [mm] | 0.33 [mm] | 0.67 [mm] |
| 50 | 0.40 [mm] | 0.67 [mm] | 1.30 [mm] |

Table 2 below indicates the relation between the magnification and the closest distance when the camera module 1 according to the present embodiment is equivalent to a telephoto optical system having a focal length 300 mm, 500 mm, or 1000 mm when converted for a 35-mm camera.

TABLE 2

The relation between the magnification and the closest distance
Focal length converted for 35-mm camera

| Magnification | 300 | 500 | 1000 |
|---|---|---|---|
| 100 | 2.0 [m] | 3.4 [m] | 6.6 [m] |
| 50 | 1.0 [m] | 1.7 [m] | 3.3 [m] |

The amount of focus shift of the camera module 1 according to the present embodiment, which includes the plurality of unit optical systems UL can be calculated by using images acquired from the image sensors 14 of the unit blocks 10 including the unit optical systems UL. In the present embodiment, since the nine unit blocks 10 in a 3×3 matrix are included, an effective baseline length is a product with the square root of nine, in other words, 20 mm approximately in terms of the S/N ratio when the pitch between the unit blocks 10 is 6 mm.

Focusing of the camera module 1 according to the present embodiment is performed by a whole extension scheme and performed by integrally moving the optical system block unit 100 (the first optical member 110, the second optical member 120, and the partition member 130) toward the object side. Specifically, the distance of the optical system block unit 100 with respect to the image unit 140 is changed at focusing. For example, in a focusing mechanism 150 as illustrated in FIG. 7, a pin 151 is attached to the outer peripheral surface of the partition member 130, and when the pin 151 is pressed up by a wedge member 152 attached to a ball screw 153 that is driven by a drive unit 154 such as a motor, the optical system block unit 100 of the camera module 1, in other words, all unit optical systems UL are moved toward the object side (in the arrow direction in FIG. 7) to perform focusing. The movement amount (extending amount) of the unit optical systems UL of the camera module 1 is equal to the extending amount to the closest distance indicated in Table 1. Specifically, the extending amount is 0.4 mm (the distance is 1.0 m as indicated in Table 2) at maximum for the camera module 1 having a focal length of 300 mm for a 35-mm camera and a magnification of 50 times, and the extending amount is 1.3 mm (the distance is 3.3 m) at maximum for the camera module 1 having a focal length of 1000 mm and a magnification of 50 times.

(Magnification-Varying)

The camera module 1 according to the present embodiment includes the plurality of unit blocks 10, and the unit optical systems UL included in the unit blocks 10 are disposed so that the optical axes thereof are substantially parallel to one another. Thus, the visual fields of the plurality of unit optical systems UL substantially overlap (visual field fvt illustrated in FIG. 8(a)). Since the camera module 1 according to the present embodiment includes the plurality of unit blocks 10, it is possible to expand the visual field of the entire camera module 1 by bending the optical axis of the unit optical system UL included in each unit block 10 to avoid overlapping of the visual fields of the unit optical systems UL. For example, as illustrated in FIG. 8(b), among the 3×3 unit optical systems UL included in the 3×3 unit blocks 10, the optical axis of the unit optical system UL of the unit block 10 at the center is not changed but the optical axes of the unit optical systems UL of the surrounding eight unit blocks 10 are bent in directions in which the visual fields thereof do not overlap, thereby achieving a large visual field as a whole. For example, when the 3×3 unit blocks 10 are included, a visual field three times larger than the visual field fvt can be achieved as illustrated with a visual field fvw in FIG. 8(b).

In a specific magnification-varying method, as illustrated in FIG. 9(a), a prism block (deflective optical system as a field prism) 160 in a field lens shape is disposed on the object side of the optical system block unit 100. As illustrated in FIG. 10, the prism block 160 is configured as a parallel flat plate for a unit optical system ULc at the center (in other words, does not bend the optical axis of the unit optical system UL at the center), and is configured so that the optical axes of the unit optical systems UL disposed around the unit optical system UL at the center are bent outward and then incident. Specifically, the optical axes of unit optical systems ULu and ULd positioned in an up-down direction (vertically adjacent) are bent in the vertical direction, the optical axes of unit optical systems ULl and ULr positioned in a right-left direction (horizontally adjacent) are bent in the horizontal direction, and the optical axes of unit optical systems ULul, Ulur, ULdl, and ULdr positioned in oblique directions are bent in oblique directions (diagonal directions of a rectangular visual field). FIG. 10 illustrates, with an arrow, a direction in which each unit optical system UL is bent.

Table 3 below indicates the relation of an angle θ of a surface of the prism block 160 for each surrounding unit optical system UL relative to a surface of the prism block 160 for the unit optical system UL at the center when the base material (medium) of the prism block 160 has a refractive index of 1.5. Table 3 indicates the angle θ relative to a horizontally adjacent unit optical system and a vertically adjacent unit optical system when a camera module 1 according to the present embodiment has a focal length of 300 mm, 500 mm, or 1000 m when converted for a 35-mm camera and the visual fields of the unit optical systems UL do not overlap nor have a gap (in other words, the nine visual fields are in closely contact with one another) as illustrated in FIG. 8(b).

TABLE 3

Prism block angle
Focal length converted for 35-mm camera

|  | 300 | 500 | 1000 |
|---|---|---|---|
| Horizontally adjacent | 13.3° | 8.0° | 4.0° |
| Vertically adjacent | 9.1° | 5.5° | 2.8° |

As understood from Table 3, for example, when the camera module 1 according to the present embodiment has a focal length of 300 mm when converted for a 35-mm camera, the visual field becomes three times larger and the focal length becomes ⅓ times longer by attaching the prism block 160 in which the angle θ of a prism horizontally adjacent to a prism for the unit optical system UL at the center is 13.3° and the angle θ of a prism vertically adjacent thereto is 9.1°, and accordingly, the magnification can be varied to a magnification equivalent to the focal length of 100 mm. Similarly, the magnification can be varied to a magnification equivalent to the focal length of 200 mm by attaching the prism block 160 in which the angles of the horizontally adjacent and vertically adjacent prisms are 6.7° and 4.6°, which are half of the above-described angles.

For example, as illustrated in FIGS. 9(b) and (c), when a region 160a in which the above-described prism block 160 is not formed, a region 160b in which the prism block 160 having the angle θ of 6.7° and 4.6° for horizontally adjacent and vertically adjacent prisms is formed, a region 160c in which the prism block 160 having the angle θ of 13.3° and 9.1° for horizontally adjacent and vertically adjacent prisms is formed are formed on a parallel plane glass plate 161 formed of a medium that transmits light, the parallel plane glass plate 161 is slid relative to the optical system block unit 100 to select the above-described region 160a so that the focal length of the camera module 1 becomes 300 mm when converted for a 35-mm camera, select the region 160b so that the focal length becomes 200 mm when converted for a 35-mm camera, and select the region 160c so that the focal length becomes 100 mm when converted for a 35-mm camera, and accordingly, the magnification can be varied at stages.

When a liquid crystal element is used as the prism block 160, the angle at which each optical axis is bent can be continuously changed, and thus the magnification can be continuously varied. Specifically, a liquid crystal element is disposed for each unit block 10 (unit optical system UL) to polarize light in directions illustrated in FIG. 10, and a prism amount is changed by changing voltage applied to each liquid crystal element. Since each liquid crystal element only has one polarization direction, the same liquid crystal elements having different orientations need to be stacked, or the same liquid crystal elements need to be stacked with a ½ wave plate interposed therebetween.

Conditions and configurations described above each achieve the above-described effects, and the present invention is not limited to those satisfying all conditions and configurations, but the above-described effects can be obtained with those satisfying either condition or configuration or satisfying a combination of some conditions or configurations.

The following describes a camera as an optical apparatus including the camera module 1 according to the present embodiment with reference to FIG. 12. This camera 60 includes the above-described camera module 1, a control unit 20, a storage unit 30, an input unit 40, and a display unit 50. The control unit 20 is an arithmetic processing device such as a CPU. The storage unit 30 is a storage device such as a RAM, a hard disk, or an SSD. In a case of a camera, the input unit 40 is a release button, and the display unit 50 is, for example, a liquid crystal display device.

In the camera 60, light from an object (subject) (not illustrated) is condensed through the unit optical systems UL of the plurality of unit blocks 10 and forms subject images on the image surfaces of the image sensors 14. Then, the subject images are photoelectrically converted by photoelectric conversion elements provided in the image sensors 14, and accordingly, an image of the subject is generated. This image is displayed on the display unit 50 provided to the camera 60 by the control unit 20. When the input unit 40 is operated by a photographer, the images photoelectrically converted by the image sensors 14 are acquired by the control unit 20, provided with synthesis processing, and stored in the storage unit 30 as a synthesized image. In this manner, the photographer can perform photographing of the subject by the camera 60. Among functions of the control unit 20, the function of acquiring images from the plurality of image sensors 14 and generating a synthesized image may be provided on the camera module 1 side or may be provided to an external instrument to perform transmission and reception as appropriate.

The following schematically describes a method for manufacturing the camera module 1 according to the present embodiment with reference to FIG. 13. First, the first optical member 110 at which the correction plate 11 and the secondary reflection mirror 13 are formed, the second optical member 120 at which the primary reflection mirror 12 is formed, the partition member 130, and the image unit 140 at which the image sensor 14 is disposed are prepared (step S100). Then, the optical system block unit 100 into which the first optical member 110, the second optical member 120, and the partition member 130 are assembled is disposed (step S200), and the image unit 140 is disposed so that the positions of the plurality of unit optical systems UL of the optical system block unit 100 are matched with the positions of the image sensors 14 (step S300). In this manner, the camera module 1 is manufactured.

With the above-described configuration, it is possible to provide the camera module 1 having a high resolution, high optical performance, and a reduced size, the optical apparatus (camera 60) including the camera module 1, and the method for manufacturing the camera module 1.

EXAMPLES

The following describes examples of the present application with reference to the accompanying drawings. FIG. 11 is a cross-sectional view of each unit optical system UL included in the camera module 1 according to each example.

First Example

A first example is a configuration of the camera module 1 in which each unit optical system UL is configured by the compact Schmidt Cassegrain scheme and the focal length is 500 mm when converted for a 35-mm camera. Each image sensor 14 is an image sensor of 2 megapixels and ⅙ inch and has a size of 2.4 mm×1.8 mm.

Table 4 below lists specifications of the unit optical system UL in the first example. In the table, $f_1$ represents the focal length of the primary reflection mirror 12, $r_1$ represents the radius of curvature of the primary reflection mirror 12, $f_2$ represents the focal length of the secondary reflection mirror 13, $r_2$ represents the radius of curvature of the secondary reflection mirror 13, f represents the overall focal length, R represents distance on the optical axis from the secondary reflection mirror 13 to the primary reflection mirror 12, D represents the distance on the optical axis from a surface of the correction plate 11 closest to the object side to the primary reflection mirror 12, TL represents a total length as the distance on the optical axis from the surface of the correction plate 11 closest to the object side to an image plane I, FNo represents the F number, and M represents the secondary magnification ratio.

The units of the focal length, the radius of curvature, and any other length in all specification values below are typically "mm", but an optical system can have equivalent optical performance when proportionally scaled up or down, and thus the present invention is not limited to "mm". This description of reference signs and a specification table also applies to the following examples.

TABLE 4

| First example - Unit optical system UL |
|---|
| $f_1$ = 6.12 |
| $r_1$ = 12.24 |
| $f_2$ = 0.75 |
| $r_2$ = 1.50 |
| f = 34.3 |
| R = 5.5 |
| D = 6.0 |
| TL = 9.4 |
| FNO = 5.7 |
| M = 5.60 |

Table 5 below lists specifications of the camera module 1 including the nine above-described unit optical systems UL in a 3×3 matrix. The synthesis F number is the F number of an image obtained by synthesizing images of the nine unit optical systems UL. Since the 3×3 unit optical systems UL are provided, an F number (synthesis F number) as a whole is ⅓ of the F number of each unit optical system UL. The size indicates lengths in a lateral direction, a longitudinal direction, and a depth direction (the optical axis direction) when the camera module 1 is viewed from the object side. The magnification (zoom) indicates focal lengths in a telephoto-end state and a wide-angle-end state when converted for a 35-mm camera.

TABLE 5

| First example - Camera module 1 | |
|---|---|
| Focal length | 34.3 [mm] |
| Synthesis F number | 1.9 |
| Size | 19.0 × 12.6 × 9.4 [mm] |
| Resolution | 10M |
| Maximum magnification | 50 |
| Closest distance | 1.7 [m] |
| Extending amount at focusing | 0.67 [mm] |
| Magnification (zoom) | 500-167 [mm] |

In this manner, when each unit optical system UL of the camera module 1 is of the compact Schmidt Cassegrain scheme, the total length of a telephoto optical system having a focal length of 500 mm when converted for a 35-mm camera can be significantly short as compared to the focal length. In addition, an aplanat optical system (optical system having no spherical aberration, coma aberration, nor astigmatism) can be obtained because of the compact Schmidt Cassegrain scheme. Thus, the camera module 1 having a thickness (length in the optical axis direction) smaller than 10 mm can be achieved.

Second Example

A second example is a configuration of the camera module 1 in which each unit optical system UL is configured by the compact Schmidt Cassegrain scheme and the focal length is 300 mm when converted for a 35-mm camera. Similarly to the first example, each image sensor 14 is an image sensor of 2 megapixels and ⅙ inch and has a size of 2.4 mm×1.8 mm.

Table 6 below lists specifications of the unit optical system UL in the second example.

TABLE 6

| Second example - Unit optical system UL |
|---|
| $f_1$ = 3.67 |
| $r_1$ = 7.34 |
| $f_2$ = 0.45 |
| $r_2$ = 0.90 |
| f = 20.6 |
| R = 3.3 |
| D = 3.6 |
| TL = 5.64 |
| FNO = 3.4 |
| M = 5.61 |

Table 7 below lists specifications of the camera module 1 including the nine above-described unit optical systems UL in a 3×3 matrix.

TABLE 7

| Second example - Camera module 1 | |
|---|---|
| Focal length | 20.6 [mm] |
| Synthesis F number | 1.1 |
| Size | 19.0 × 12.6 × 5.7 [mm] |
| Resolution | 10M |
| Maximum magnification | 50 |
| Closest distance | 1.0 [m] |
| Extending amount at focusing | 0.40 [mm] |
| Magnification (zoom) | 300-100 [mm] |

Since each unit optical system UL of the camera module 1 is of the compact Schmidt Cassegrain scheme in this manner, the total length of a telephoto optical system having a focal length of 300 mm when converted for a 35-mm camera can be significantly short as compared to the focal length. In addition, an aplanat optical system (optical system having no spherical aberration, coma aberration, nor astigmatism) can be obtained because of the compact Schmidt Cassegrain scheme. Thus, the camera module 1 having a thickness (length in the optical axis direction) smaller than 10 mm can be achieved.

Third Example

A third example is a configuration of the camera module 1 in which each unit optical system UL is configured by the compact Schmidt Cassegrain scheme and the focal length is 1000 mm when converted for a 35-mm camera. Similarly to the first example, each image sensor 14 is an image sensor of 2 megapixels and ⅙ inch and has a size of 2.4 mm×1.8 mm.

Table 8 below lists specifications of the unit optical system UL in the third example.

TABLE 8

Third example - Unit optical system UL $f_1$ = 12.24
$r_1$ = 24.5
$f_2$ = 1.50
$r_2$ = 3.00
f = 68.6
R = 11.0
D = 12.0
TL = 18.8
FNO = 11.4
M = 5.60

Table 9 below lists specifications of the camera module 1 including the nine above-described unit optical systems UL in a 3×3 matrix.

TABLE 9

Third example - Camera module 1

| | |
|---|---|
| Focal length | 68.6 [mm] |
| Synthesis F number | 3.8 |
| Size | 19.0 × 12.6 × 18.8 [mm] |
| Resolution | 10M |
| Maximum magnification | 50 |
| Closest distance | 3.3 [m] |
| Extending amount at focusing | 1.30 [mm] |
| Magnification (zoom) | 1000-333 [mm] |

When each unit optical system UL of the camera module 1 is of the compact Schmidt Cassegrain scheme in this manner, the total length of a telephoto optical system having a focal length of 1000 mm when converted for a 35-mm camera can be significantly short as compared to the focal length. In addition, an aplanat optical system (optical system having no spherical aberration, coma aberration, nor astigmatism) can be obtained because of the compact Schmidt Cassegrain scheme. Thus, the camera module 1 having a thickness (length in the optical axis direction) smaller than 20 mm can be achieved.

Reference Example

As a reference example, Table 10 below lists specifications of a unit optical system UL configured by the Schmidt Cassegrain scheme and having a focal length of 300 mm when converted for a 35-mm camera. In the reference example as well, similarly to the first example, the image sensor 14 is an image sensor of 2 megapixels and ⅙ inch and has a size of 2.4 mm×1.8 mm.

TABLE 10

Reference example $f_1$ = 14.3
$r_1$ = 28.6
$f_2$ = 14.3
$r_2$ = 28.6
f = 24.0
R = 10.0
D = 14.3
TL = 15.9

When each unit optical system UL is configured by the Schmidt Cassegrain scheme, a telephoto optical system having a focal length of 300 mm when converted for a 35-mm camera can have a short total length as compared to the focal length and have no field curvature, in other words, having a zero Petzval sum. However, the total length is long as compared to a case of the compact Schmidt Cassegrain scheme.

As described above, the camera module 1 according to the present embodiment is a telephoto camera module in which the plurality of unit optical systems UL of the compact Schmidt Cassegrain scheme are disposed in an array and that has a high resolution and is thin (has a small size in the optical axis direction).

In the camera module 1 according to the present embodiment, as described above, the correction plates 11, the primary reflection mirrors 12, and the secondary reflection mirrors 13 can be formed on the two plane optical members (the parallel plane glass plates 111 and 121) by imprinting or mask coating, and the first optical member 110 and the second optical member 120 are combined with the partition member 130 for completion. Thus, the camera module according to the present embodiment can be manufactured through a process simpler than a process in which each unit optical system UL is formed and then the plurality of unit optical systems UL are disposed as one optical system block unit 100.

The number of correction plates 11 and the number of secondary reflection mirrors 13 included in the first optical member 110 are equal to each other. The number of secondary reflection mirrors 13 included in the first optical member 110 and the number of primary reflection mirrors 12 included in the second optical member 120 are equal to each other. The number of unit optical systems UL included in the optical system block unit 100 is equal to the number of unit optical systems UL that can be obtained through separation by the partition member 130.

Although the correction plates 11 are provided in the present embodiment, this is not essential and the upper surface of the parallel plane glass plate 111 may not be provided with the correction plates 11. In the present embodiment, each correction plate 11 and the corresponding secondary reflection mirror 13 may not be integrated but may be separated, and the positions of the correction plates 11 are not limited. The shape of each correction plate 11 is not particularly limited but may be changed as appropriate.

In the present embodiment, the secondary reflection mirrors 13 and the primary reflection mirrors 12 are provided on the parallel plane glass plates 111 and 121, respectively, but the shape and material of each glass plate are not limited, and the glass plate may not be parallel nor plane and may be a plate member of a resin material.

The method of forming the primary reflection mirrors 12, the secondary reflection mirrors 13, and the like may be changed as appropriate, and the first optical member 110 and the second optical member 120 are formed and then combined, but the first optical member 110, the second optical member 120, and the partition member 130 may be sequentially formed on a surface of a plate member as a reference.

A plan view shape (shape of each unit optical system UL when viewed in a direction along an optical axis incident on the image sensor 14) of each region partitioned by the partition member 130 is preferably equivalent to a plan view shape of the image sensor 14. For example, when the plan view shape of the image sensor 14 is rectangular, the plan view shape of each region partitioned by the partition member 130 is preferably rectangular. The plan view shape of the primary reflection mirror 12 and the plan view shape of the secondary reflection mirror 13 may be changed as appropriate and are preferably equivalent to the plan view shape of the image sensor 14. The plan view shapes of the aperture part 12a, the correction plate 11, and the refractive optical system 15 may be changed as appropriate and are preferably equivalent to the plan view shape of the image sensor 14.

In the present embodiment, the partition member 130 is provided as an opaque member but may be changed as appropriate as long as a ray from each unit optical system UL can be prevented being incident on an adjacent unit optical system UL. For example, the partition member 130 may be a diffusive member such as a ground glass. The opaque member does not need to completely prevent ray incidence but only needs to prevent ray incidence to such an extent (for example, 20% of incident light) that the image sensors 14 are not affected.

Although the present embodiment describes that the nine unit optical systems are all same, a plurality of unit optical systems among which optical properties such as the focal length, the photographing distance, and the F number are different may be combined as one optical apparatus. In this case, it is preferable to include at least one unit optical system of the compact Schmidt Cassegrain scheme as in the present embodiment because photographing at a telephoto distance becomes possible.

When a plurality of unit optical systems having optical properties different from one another are combined, the shapes of some of nine primary reflection mirrors (or secondary reflection mirrors) may be different from one another, the focal lengths of some of nine correction plates may be different from one another, and refractive optical systems having focal lengths different from one another may be disposed in the nine unit optical systems, respectively.

At least one of the nine unit optical systems may be an illumination optical system. In this case, the image sensor 14 of a unit optical system UL of the present embodiment may be replaced with an illumination unit such as an LED, and the reflection mirror and the correction plate may be omitted in a region in which light from the illumination unit is incident.

At focusing or the like, the nine unit optical systems UL are integrally moved, but may be moved to change the distance between each of at least some of the unit optical systems UL and the corresponding image sensor 14.

REFERENCE SIGNS LIST 1 camera module
10 unit block
11 correction plate (transmissive member)
12 primary reflection mirror (first reflection member)
13 secondary reflection mirror (second reflection member)
14 image sensor
60 camera (optical apparatus)
100 optical system block unit
110 first optical member
120 second optical member
130 partition member
140 image unit
160 prism block (deflective optical system)
UL unit optical system

The invention claimed is:

1. A camera module comprising:
a unit optical system including a first reflection member and a second reflection member sequentially from an object side along an optical axis and configured to form an image of an object;
an image sensor configured to capture the image formed by the unit optical system; and
a plurality of unit blocks each including the unit optical system and the image sensor,
wherein the unit optional system includes a transmissive member that transmits light from the object.

2. The camera module according to claim 1, wherein the transmissive member has an aspherical surface.

3. The camera module according to claim 2, wherein the aspherical surface has at least one inflection point from the optical axis toward a periphery.

4. The camera module according to claim 1, wherein a condition of an expression below is satisfied:

$$-0.1 < f/fa < 0.1,$$

where
f represents an overall focal length of the unit optical system, and
fa represents a focal length of the transmissive member.

5. The camera module according to claim 1, wherein the transmissive member is integrated with the second reflection member.

6. The camera module according to claim 1, wherein an opaque member or a diffusive member is provided at a boundary between the unit blocks.

7. The camera module according to claim 6, wherein the opaque member or the diffusive member is positioned between each first reflection member and the corresponding second reflection member.

8. The camera module according to claim 6, wherein the plurality of opaque members or diffusive members are integrally formed.

9. The camera module according to claim 1, wherein the plurality of first reflection members are integrally formed.

10. The camera module according to claim 1, wherein the plurality of second reflection members are integrally formed.

11. The camera module according to claim 1, wherein the plurality of transmissive members are integrally formed.

12. The camera module according to claim 1, wherein the unit optical system satisfies a condition of an expression below:

$$3.0 < M < 8.0,$$

where
M represents $f/f_1$,
f represents an overall focal length of the unit optical system, and
$f_1$ represents a focal length of the first reflection member.

13. The camera module according to claim 1, wherein the unit optical system satisfies a condition of an expression below:

$$f < 500 \text{ mm},$$

where f represents an overall focal length of the unit optical system.

14. The camera module according to claim 1, wherein distances between least some of the unit optical systems and the corresponding image sensors are changed at focusing.

15. The camera module according to claim 1, further comprising a deflective optical system configured to bend the optical axis of at least one of the plurality of unit optical systems.

16. The camera module according to claim 1, wherein the number of unit blocks is nine.

17. The camera module according to claim 1, further comprising a control unit configured to generate an image by synthesizing the images acquired from the plurality of image sensors.

18. An optical apparatus comprising the camera module according to claim 1.

19. A method for manufacturing a camera module including
- a unit optical system including a first reflection member and a second reflection member sequentially from an object side along an optical axis and configured to form an image of an object, the unit optical system including a transmissive member that transmits light from the object,
- an image sensor configured to capture the image formed by the unit optical system, and
- a unit block including the unit optical system and the image sensor,
- the method comprising a step of disposing a plurality of the unit blocks.

* * * * *